United States Patent [19]

Dunphy et al.

[11] Patent Number: 5,638,509
[45] Date of Patent: Jun. 10, 1997

[54] DATA STORAGE AND PROTECTION SYSTEM

[75] Inventors: William E. Dunphy, Westminster; Steven M. Halladay, Louisville; Michael E. Moy, Lafayette; Frederick G. Munro, Broomfield, all of Colo.

[73] Assignee: Exabyte Corporation, Boulder, Colo.

[21] Appl. No.: 663,377

[22] Filed: Jun. 13, 1996

Related U.S. Application Data

[63] Continuation of Ser. No. 537,036, Sep. 29, 1995, abandoned, which is a continuation of Ser. No. 258,391, Jun. 10, 1994.

[51] Int. Cl.$^6$ .................................................. G06F 11/08
[52] U.S. Cl. .................................................. 395/182.18
[58] Field of Search .................. 395/182.18, 183.01, 395/182.13; 364/268, 268.1, 268.3, 268.5, 245.5, 245.6, 285, 285.1; 369/272; 365/201; 360/39; 324/527

[56] References Cited

U.S. PATENT DOCUMENTS

| | | | |
|---|---|---|---|
| 5,089,958 | 2/1992 | Horton et al. | 395/575 |
| 5,133,065 | 7/1992 | Cheffetz et al. | 395/575 |
| 5,163,148 | 11/1992 | Walls | 395/600 |
| 5,210,866 | 5/1993 | Milligan et al. | 395/575 |
| 5,241,668 | 8/1993 | Eastridge et al. | 395/575 |
| 5,241,669 | 8/1993 | Cohn et al. | 395/575 |
| 5,241,670 | 8/1993 | Eastridge et al. | 395/575 |
| 5,263,154 | 11/1993 | Eastridge et al. | 395/575 |
| 5,276,860 | 1/1994 | Fortier et al. | 395/575 |
| 5,276,867 | 1/1994 | Kenley et al. | 395/600 |
| 5,347,653 | 9/1994 | Flynn et al. | 395/600 |
| 5,454,099 | 9/1995 | Myers et al. | 395/575 |
| 5,515,502 | 5/1996 | Wood | 395/182.13 |
| 5,544,359 | 8/1996 | Tada et al. | 395/600 |

*Primary Examiner*—Robert W. Beausoliel, Jr.
*Assistant Examiner*—Stephen C. Elmore
*Attorney, Agent, or Firm*—Nixon & Vanderhye, P.C.

[57] ABSTRACT

The data storage and protection apparatus maintains an index of all data file activity on a computer system and stores copies of data files in a manner to enable a user to recreate the state of the computer system at any selected point in time. A data file monitor intercepts all communication between application programs and the file system to obtain data file status and activity information. This information is used to identify data files which are transmitted to a data file backup media for storage along with directory information that identifies the stored files to enable the system to later locate and retrieve data files that were stored on the backup media.

39 Claims, 6 Drawing Sheets

DATA STORAGE AND PROTECTION SYSTEM

This is a continuation of application Ser. No. 08/537,036, filed Sep. 29, 1995, now abandoned. Which is a file wrapper continuation of application Ser. No. 08/258,391, filed Jun. 10, 1994.

CROSS-REFERENCE TO RELATED APPLICATIONS

This application is related to an application Ser. No. 08/258,800, titled "Data Backup System for Personal Computers", filed on Jun. 13, 1994; an application Ser. No. 08/258,582, titled "Data Storage and Protection System", filed on the same date as the present application Ser. No. 08/258,510; and an application titled "Cold Boot Data Backup System", filed on the same date as the present application.

FIELD OF THE INVENTION

This invention relates to data storage protection systems and, in particular, to a data backup system that automatically produces a temporal record of all data file activity in a computer system and provides apparatus to record all activity for user identified data files.

PROBLEM

It is a problem in computer systems to safeguard the integrity of data files stored thereon. Data files can be lost or corrupted by user error or by equipment failure. A method of recovering from such incidents is to maintain a backup copy of the data files so that the original data file can be recreated from the backup copy. A difficulty with this philosophy is that users find the process of backing up data files burdensome and typically do not implement such procedures even when the computer system is equipped with data file backup apparatus. In addition, existing data backup systems are difficult to use when attempting to retrieve lost data files and typically provide only limited data file retrievability since these systems are only infrequently activated. All data file activity that transpired since the last data backup session is lost, and may represent the most pertinent data files to the user.

There presently does not exist any data backup system that is both simple to use and which provides a significantly thorough data file protection capability to warrant widespread use.

SOLUTION

The above-described problems are solved and a technical advance achieved in the field by the data storage and protection apparatus of the present invention which maintains an index of all data file activity on a computer system and stores copies of data files in a manner to enable a user to recreate the state of the computer system at any selected point in time. The data storage and protection apparatus interposes data file monitor software between the file system and application programs resident on the computer system to intercept all communication therebetween. The monitor software extracts data file status and activity information from the intercepted communications and uses this data to maintain an event log that indicates a history of all data file activity on the computer system. The communications are then forwarded unmodified by the monitor software to their originally intended destination.

A database located in the data storage and protection apparatus periodically retrieves the event log and uses the information contained therein to identify data files that are then transmitted to a data file backup media for storage. The monitor software also maintains a "stash can" section of memory that is used as a virtual data file backup system to temporarily store data files that the user deletes or modifies, to enable the database to store these files on the backup media when the backup process is enabled. The database writes the selected data files as well as directory information on to the backup media to enable the system to later locate and retrieve data files that were stored on the backup media to recreate a single lost data file or to recreate the state of a selected data file or the computer system at a selected point in time. Thus, the database maintains a three-dimensional file system on the backup media with the computer system file system structure representing a two-dimensional presentation of the file system memory and the temporal sequence of changes to all the data files in the file system representing a third dimension. Every data file that is selected by the user to be monitored and preserved by this apparatus is stored on the backup media in a time sequenced manner so that every version of the data file is resident on the backup media and the directory data on the backup media provides a history of all activity for this data file.

When the user requests that a selected data file be restored to a selected point in time, or the user restores the entirety of the computer system memory in response to a file system failure, the data storage and protection system reviews the directory information stored on the backup media and uses this data to identify the version of each data file that was resident on the computer system at the selected point in time. The directory information also indicates the physical location of each of these data file versions on the backup media or the stash can memory. The data storage and protection system then locates and retrieves each identified data file. The retrieved data files are then written to the computer system memory to recreate the state of the computer system memory at the selected point in time.

The data storage and protection system automatically monitors all data file activity on the computer system and maintains a list of all data files that are to be backed up to backup media. The data storage and protection apparatus, on a user initiated, timed or automatic basis, then transmits the selected data files to the backup device for storage on the backup media. If a failure occurs, the data storage and protection apparatus performs the data file location, retrieval and restore operations, independent of the user. This system is therefore simple to use, and provides a much finer granularity of data file restore capability than prior art data backup systems.

DETAILED DESCRIPTION

Figure 1:
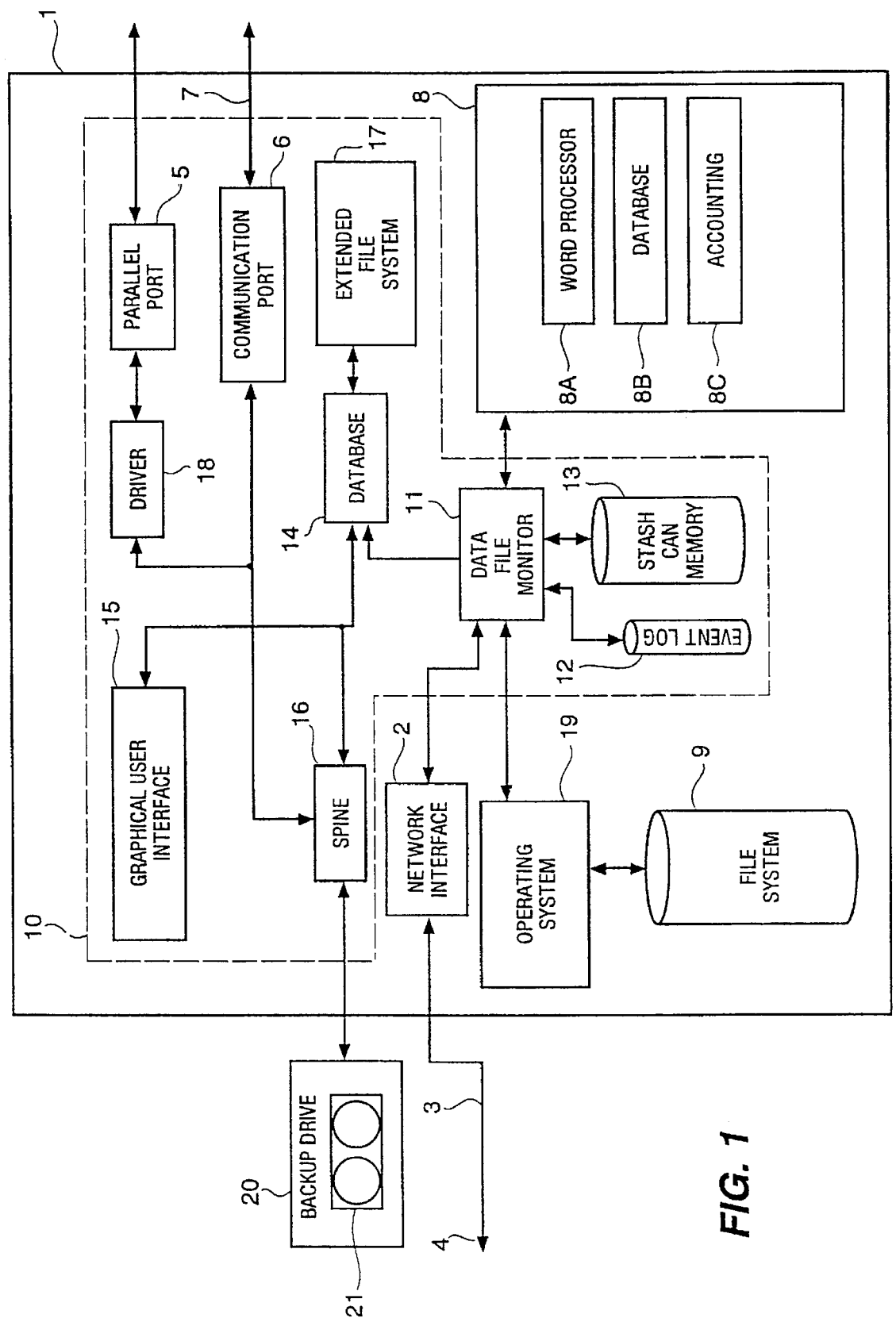
FIG. 1 illustrates in block diagram form the overall architecture of the data storage and protection system of the present invention as resident on a computer system.

FIG. 1 illustrates in block diagram form the overall architecture of the data storage and protection apparatus 10 of the present invention which maintains an index of all data file activity on a computer system 1 and stores copies of data files in a manner to enable a user to recreate the state of the computer system 1 at any selected point in time. The computer system 1 can be any processor, whether multi-user or single user, and whether mainframe, personal computer, laptop computer, etc. It is envisioned that the computer system 1 can be part of a network 3 wherein users external to the computer system 1 may have access to data files resident in the memory of the computer system 1. FIG. 1 therefore simply illustrates computer system 1, which is connected via network interface 2 and communication media 3 to a remote computer system 4. The presence of remote computer system 4 is not necessary for the operation of data storage and protection apparatus 10, but is included to illustrate some of the capabilities of data storage and protection apparatus 10.

The data storage and protection apparatus 10 is installed on computer system 1 and serves to store selected data files on a backup media 21 that is located in backup drive 20. The backup media 21 is a writeable media, and can be mountable magnetic tape, fixed disk drive media, mountable disk drive media, disk drive array, or any other media that can be written to at least once and read from many times. The backup drive 20 is typically a separate device that is connected to computer system 1 via an interface, such as the parallel port 5 of the computer system 1 or a data communication port 6. The backup device 20 can be collocated with computer system 1 or can be located remote from computer system 1 and connected thereto via a data communication link 7 or network 3.

Figure 3:
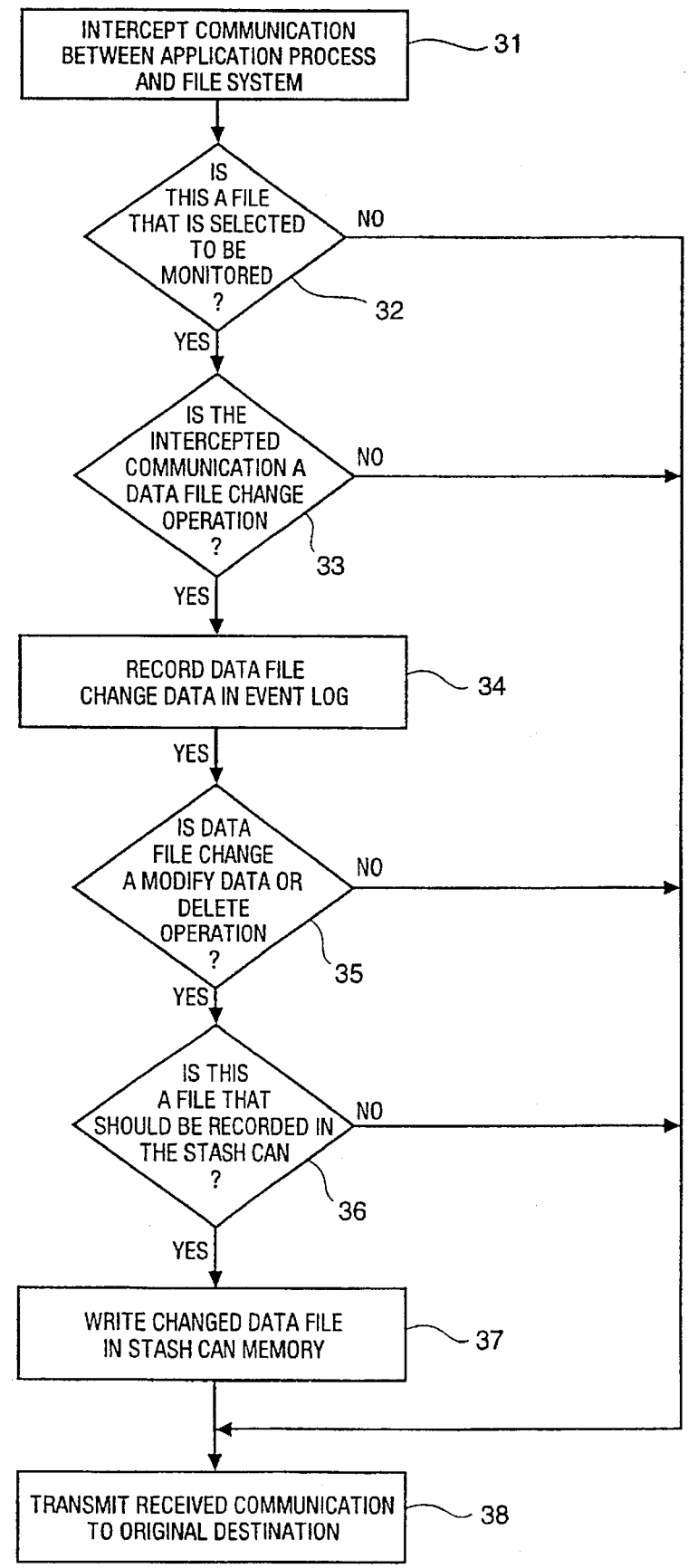
FIG. 3 illustrates in flow diagram form the operational steps taken by the data file monitor in its operation.

The computer system 1 includes an operating system 19, a plurality of application programs 8 and a file system 9 in conventional configuration. The data storage and protection system 10 interposes data file monitor 11 between the file system 9 and the application programs 8 resident on the computer system 1 to intercept all communication therebetween. The terms "interposed" and "intercept", as used herein, are broadly construed, wherein it is envisioned that the communications generated by both application programs 8 and file system 9 are routed to data file monitor 11. The operation of the data file monitor 11 is disclosed in flow diagram form in FIG. 3. At step 31, the data file monitor 11 intercepts or receives a communication between one of the application programs 8 and the file system 9. The data file monitor 11 reviews this communication at step 32 to determine whether this communication relates to a data file that the user has selected to be monitored. If not, processing advances to step 38 as described below. If the data file is to be monitored, processing advances to step 33 where it is determined whether this communication results in a data file change. Data file changes can include data file create, write, delete, modify data, modify attributes, copy, move, directory create, delete. If the received communication does not result in one of these events, then processing advances to step 38 where the communications are forwarded unmodified by the data file monitor 11 to their originally intended destination. Processing then returns to step 31 to await the next communication between the application programs 8 and the file system 9. If a data file change is detected, at step 34, the data file monitor 11 extracts data file status and activity information from the received communications and uses this data to maintain an event log 12 that indicates a history of all presently occurring data file activity on the computer system 1. The data file monitor 11 also determines, at step 35, whether the operation is one that changes the contents of the data file, such as a data file delete or data modify operation. Any data change action that would cause the loss of the original data in the data file causes the data file to be saved. If the user has changed a data file, then at step 36 a determination is made whether this data file is one that should be saved and recorded in the stash can memory 13. If not, processing advances to step 38, otherwise the data file monitor 11 writes this data file into a stash can memory 13 at step 37. Processing then proceeds to step 38, as it does when no data file change operation is being executed. At step 38, the communications are then forwarded unmodified by the data file monitor 11 to their originally intended destination. Thus, the communications can be directly routed to data file monitor 11 and stored therein for a period of time or can be passed through data file monitor 11 without substantial delay and the required data extracted therefrom while the communications are passed through data file monitor 11.

Event Log

The event log 12 consists of a data file typically maintained by data file monitor 11 in the memory of computer system 1. The event log 12 includes a list of all data files resident in computer system 1 that have been subject to change since the last data file backup activity on computer system 1. The monitored changes typically include data file create, write, delete, modify data, modify attributes, copy, move, directory create, delete. For each of these data file changes, the data file monitor 11 creates an entry in event log 12 that identifies the data directory/data file, the nature of the change, extent of the data file, the time that this change occurred and any other pertinent administrative information, such as user identification, that may be pertinent to the operation of the data file storage and protection system 10.

Initiation of Data Protection Process

Figure 2:
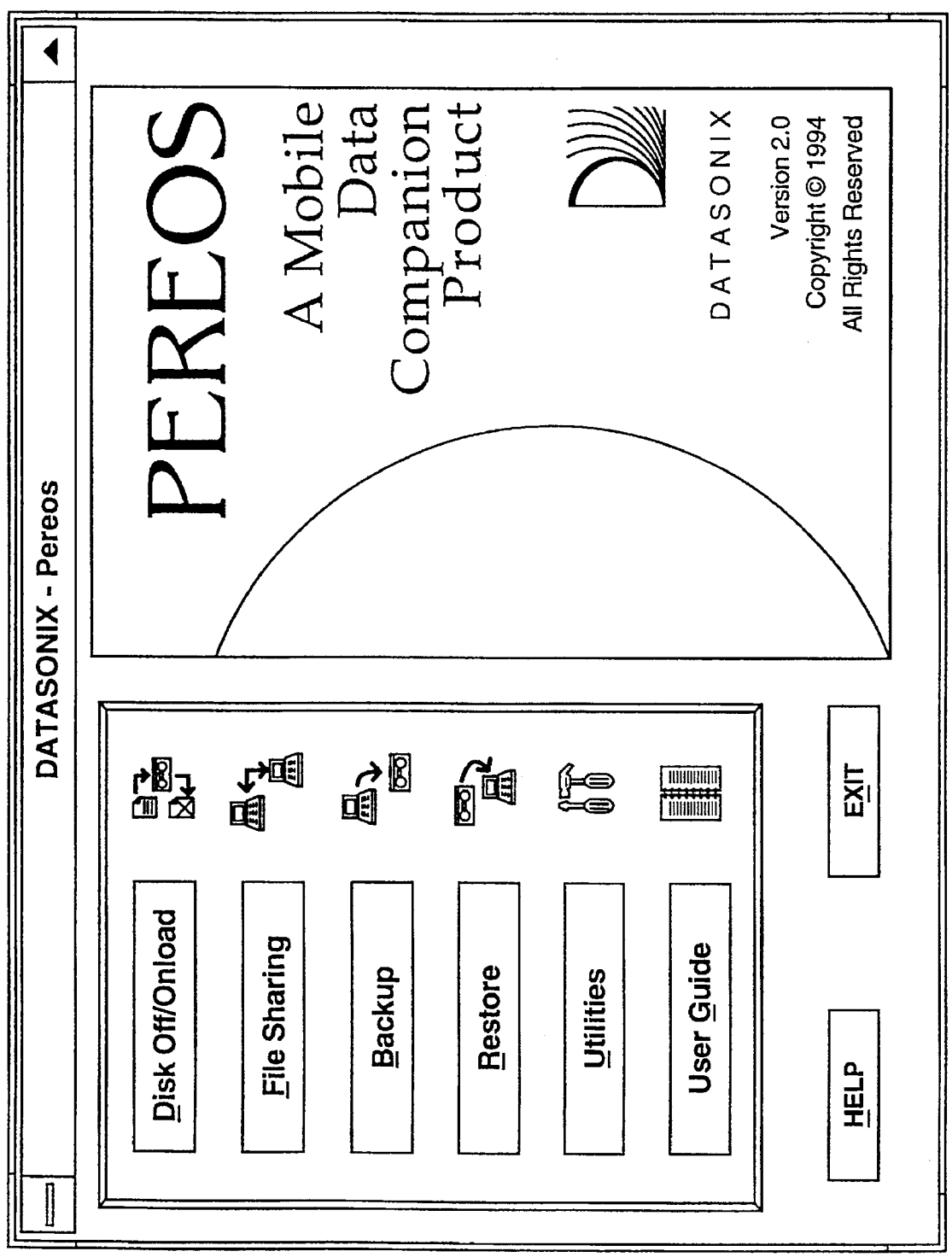
FIG. 2 illustrates a typical main menu screen that is presented to the user by the data storage and protection system.

A database 14 located in the data storage and protection apparatus 10 retrieves the event log 12 and uses the information contained therein to identify data files that are to be transmitted to a data file backup media 21 for storage. The database also contains a complete history of all data file changes since it stores the event log entries in its history file. The data file backup process is a function of the procedure defined by the user. There is a significant amount of customization that can take place within data storage and protection system 10 to satisfy the needs of individual users. In particular, graphical user interface 15 is provided to enable the user to activate and control the operation of data storage and protection system 10. There are typically a plurality of user interface screens that can be displayed to the user by data storage and protection system 10 and only a small number of these are disclosed herein for the purpose of simplicity of description. Thus, FIG. 2 illustrates the typical main menu screen presented to the user which enables the user to select the data storage and protection parameters, and which also enables the user to select a one of the many features that are available on the data storage and protection system 10.

The data storage and protection system 10 is philosophically a data file repository system that can be used for a number of different and complementary purposes. A primary function of the data storage and protection system 10 is to backup data files that are created and modified by the user on to a backup media 21 for safekeeping. To accomplish this goal, it is expected that a user first backs up the entirety of the data stored in the memory of computer system 1. In a personal computer, this backup is a dump of the contents of the hard drive. The user then programs the data storage and protection system 10 to "track" selected data files, directories, subdirectories, or even the entire data file memory of computer system 1. The data storage and protection system 10, as noted above, monitors data file activity on computer system 1 and stores all versions of the identified data files on the backup media 21. This process records the incremental changes to the memory of computer system 1 over time and provides a total record of the selected data files. In addition, the data storage and protection system 10 provides a mass memory capability that can be used to store vast quantities of data for retrieved by the user on an as needed basis. Thus, the backup media 21 can be populated with many data files by writing the data files on the memory of computer system 1, backing up these data files on to the backup media 21, then expunging the data files from the memory, or retaining only a "placeholder" version of the data file in memory to enable the user to "page through" the catalog of data files stored on the backup media 21. The backup media 21 then functions not only as a backup element but also as a "virtual automated data library" wherein the user can retrieve a data file via the restore capability of the data storage and protection system 10. Mass quantities of data can then be transported with a portable computer without completely filling the hard drive, since the media drive 20 is lightweight, portable and battery powered.

The user accesses the data storage and protection system 10 via the standard application program activation process native to computer system 1. The data storage and protection system 10, when activated, presents the user with the display illustrated in FIG. 2. The user can then select the configuration selection option which activates the capability for the user to define the mode of data backup and to identify the elements that are to be protected. This process is similar to existing data backup systems and is not described in great detail herein in the interest of brevity and clarity of description. The user can elect to have the data storage and protection system 10 reside on computer system 1 in a quiesced mode which requires the user to activate the data storage and protection system 10 to backup data. Alternatively, the user can elect to have the data storage and protection system 10 periodically activated so that the data file backup occurs on a regularly scheduled basis, independent of the user. In addition, other modes can be selected, such as initiating a user prompt or an automated operation as a function of the number of data files and/or their cumulative extent listed in the event log 12.

The data file monitor 11 also maintains a "stash can" 13 section of memory that is used to temporarily store data files that the user modifies or deletes, to enable the database to store these files on the backup media when the backup process is enabled. The stash can memory 13 can also be an activating factor, so that when that dedicated portion of memory is filled to a predetermined level, the user is prompted to initiate a backup or the data storage and protection system 10 automatically backs up the data files that are stored in the stash can memory 13.

Data File Backup Process

Figure 4:
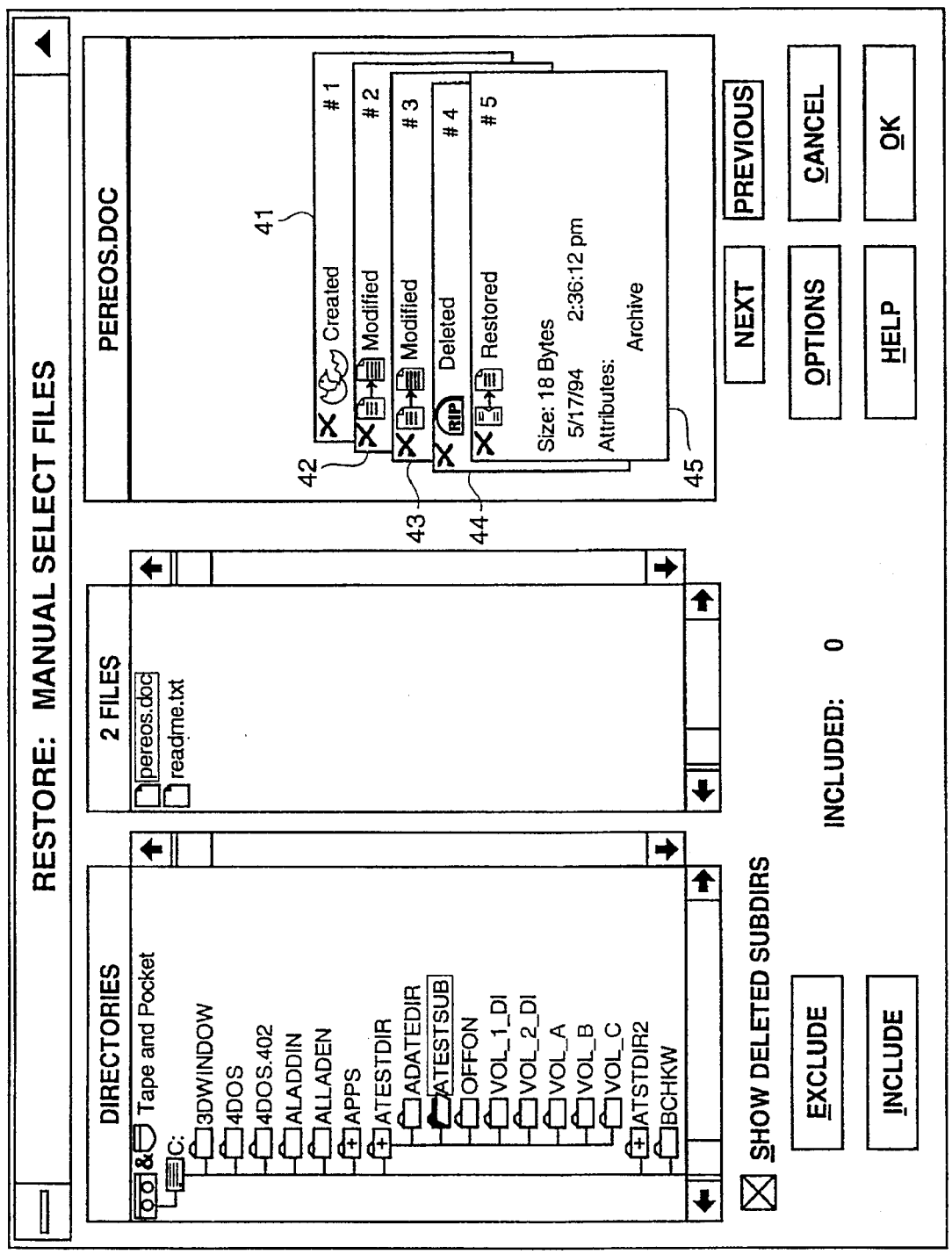
FIG. 4 illustrates a conceptual view of the data stored in the extended file system.

Regardless of the initiation mode, the graphical user interface 15 transmits data to database 14 to define the data file backup procedure extant in computer system 1 for the identified user. The user screen of FIG. 4 illustrates conceptually a typical data file restore procedure. The database 14, when activated, reads the contents of event log 12 to determine what data files have been changed since the last backup process was activated. The database 14 includes an extended file system 17 which is a definition of the file system active in computer system 1. Included in extended file system 17 is a temporally oriented listing of all data files identified by the user as requiring protection. The temporal listing thereby provides a three-dimensional version of file system 9, with the tree-like structure of file system 9, native to the operating system 7, being a two-dimensional representation of the directories, subdirectories, and data files that comprise file system 9. Thus, the set of temporally ordered versions of each data file provides the third dimension to this extended file system 17. For example, as shown in FIG. 4, a first instance 41 of a data file represents the initial creation of the, data file. As users access this data file, changes are made to the data file and recorded on the backup media 21 as new instances of the data file 41. Each successively modified version 42, 43 of the data file 41 represents a time-wise progression of the data file 41. The various versions 4* of data file 41 are noted in extended file system 17 so that a user can identify a particular version of the data file 41 that is desired when the data file 41 is to be restored or a prior version of the data file viewed. The entries in extended file system 17 include markers 44 to illustrate that the data file 4* was restored as version 43 to the memory of computer system 1 at a particular point in time. Furthermore, the deletion of this data file 4* is noted as entry 45 and a copy of the data file 4* as it existed at the time of deletion is temporarily stored in stash can memory 13 and later written to the backup media 21. The extended file system 17 preserves the data from which file system 9 can be recreated, at any selected point in time, since the data storage and protection system 10 was activated in computer system 1. The baseline of extended file system 17 is the contents of file system 9 at the time the data storage and protection system 10 was activated.

Spine System

The spine system 16 writes the selected data files as well as directory information on to the backup media 21 to enable the data storage and protection system 10 to later locate and retrieve data files that were stored on the backup media 21 to recreate a single lost data file or to recreate the state of the computer system 1 at a selected point in time. The database 14 provides the data file in need of backup information to graphical user interface system 15 which uses this information to direct the creation of a spine system 16 plan, which is a listing of all data files stored in the file system 9 or stash can memory 13 that require backup the next time that the backup process is activated. The spine system 16 places the identified data files in logical format and, when the backup process is activated, transmits each data file seriatim to the driver 18 which comprises a state machine that converts the data file to the physical format required to transmit the data file via parallel port 5 (for example) to the backup device 20 for storage on backup media 21.

The extended file system 17 can obviously grow in extent to occupy a significant amount of memory of computer system 1. To limit the size of extended file system 17, the oldest section of extended file system 17 can be pruned from extended file system 17 and written to backup media 21 as with any other data file. The extended file system 17 then notes the existence of the pruned section of extended file system 17 located on backup media 21. If the user requests access to a data file that was stored on backup media 21 and whose extended file system information is also written to backup media 21, then spine system 16 must first retrieve the pruned section of extended file system 17 from the backup media 21 to obtain the information relating to the location of the requested data file.

Backup Device

The backup device 20 is connected to the computer system via a communication interface, such as parallel port 5 as described in copending patent application titled "Data Backup System for Personal Computers". The backup device comprises a device that uses a rewriteable media to store large quantities of data for data storage and protection system 10. One example of such a backup device 20 is a tape drive that uses tape cassettes to store data. The data stored on this backup media 21 can require the use of multiple media elements, and data storage and protection system 10 maintains a record of how many backup media elements are used and also writes data file directory information on to the media elements. Thus, the data file backup process results in a plurality of data files being written on backup media 21, which can be magnetic tape cassette media. The spine system 16 of data storage and protection system 10 writes a directory listing of all the data files that have been written on to the backup media 21 in this operation on the backup media 21, at the end of the backup media 21 so it can be simply and quickly located. Thus, the backup media 21 is self defining, in that the directory data written thereon denotes which data files are written on the backup media 21 and their temporal definition.

Thus, the database 14 maintains a three-dimensional file system on the backup media 21, with the file system structure representing a two-dimensional presentation of the computer system memory and the temporal sequence of changes to all the data files in the file system representing a third dimension. Every data file that is selected by the user to be monitored and preserved by data storage and protection system 10 is stored on the backup media 21 in a time sequenced manner so that every version of the data file is resident on the backup media 21 and the directory data on the backup media 21 provides a history of all activity for this data file.

Data File Retrieval/Reconstruction

When the user requests that a selected data file be restored to a selected point in time, or the user restores the entirety of the computer system memory in response to a crash, the data storage and protection system 10 reviews the directory information stored in database 14 and/or on the backup media 21 and uses this data to identify the version of each data file that was resident on the computer system 1 at the selected point in time. The directory information also indicates the physical location of each of these data file versions on the backup media 21. The data storage and protection system 10 then locates and retrieves each identified data file from the backup media 21. The retrieved data files are then written to the computer system memory to recreate the state of the computer system memory at the selected point in time.

Figure 5:
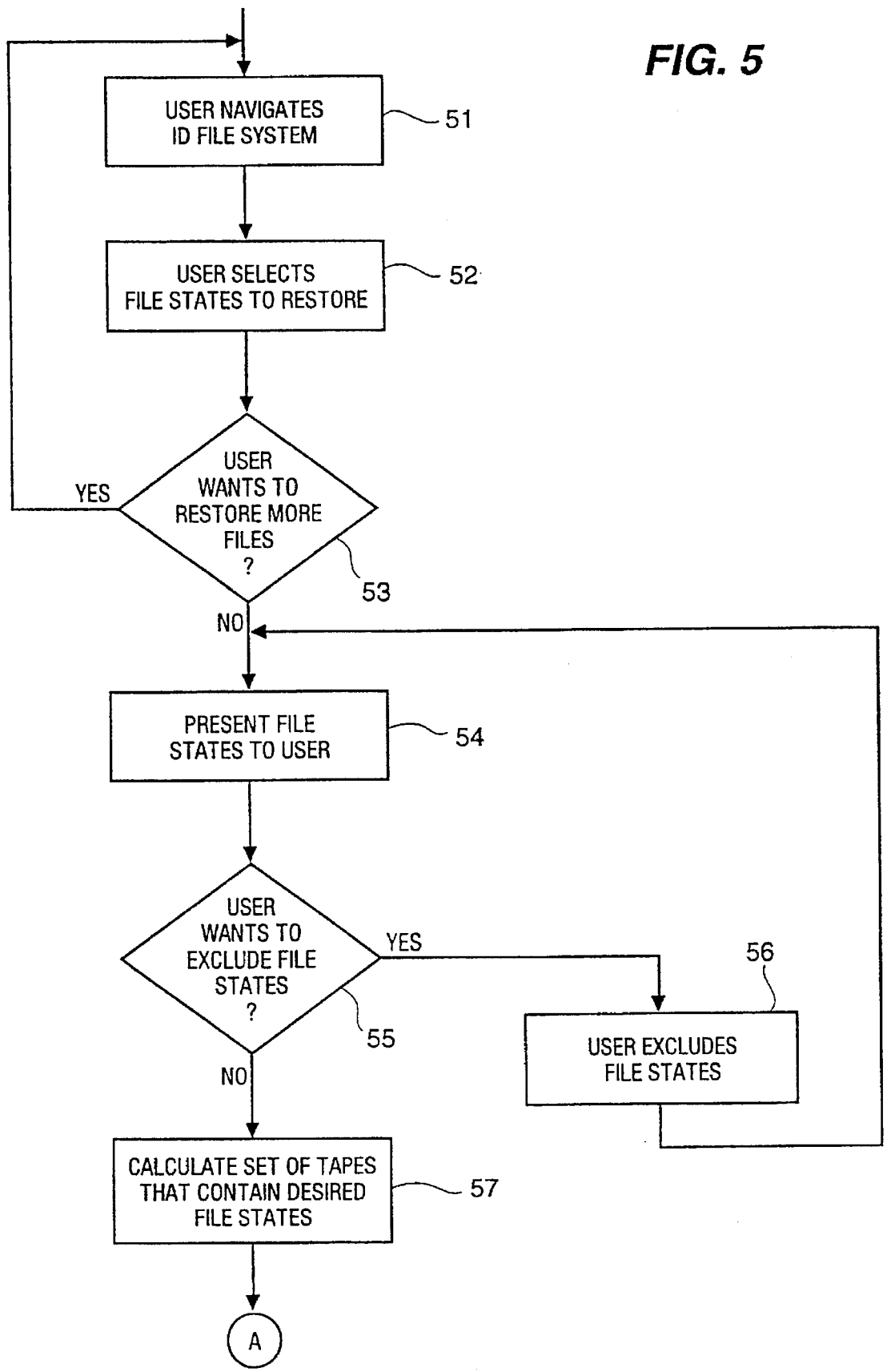
FIGS. 5 and 6 illustrate in flow diagram form the operational steps taken by the data storage and protection system of the present invention to restore data files.
Figure 6:
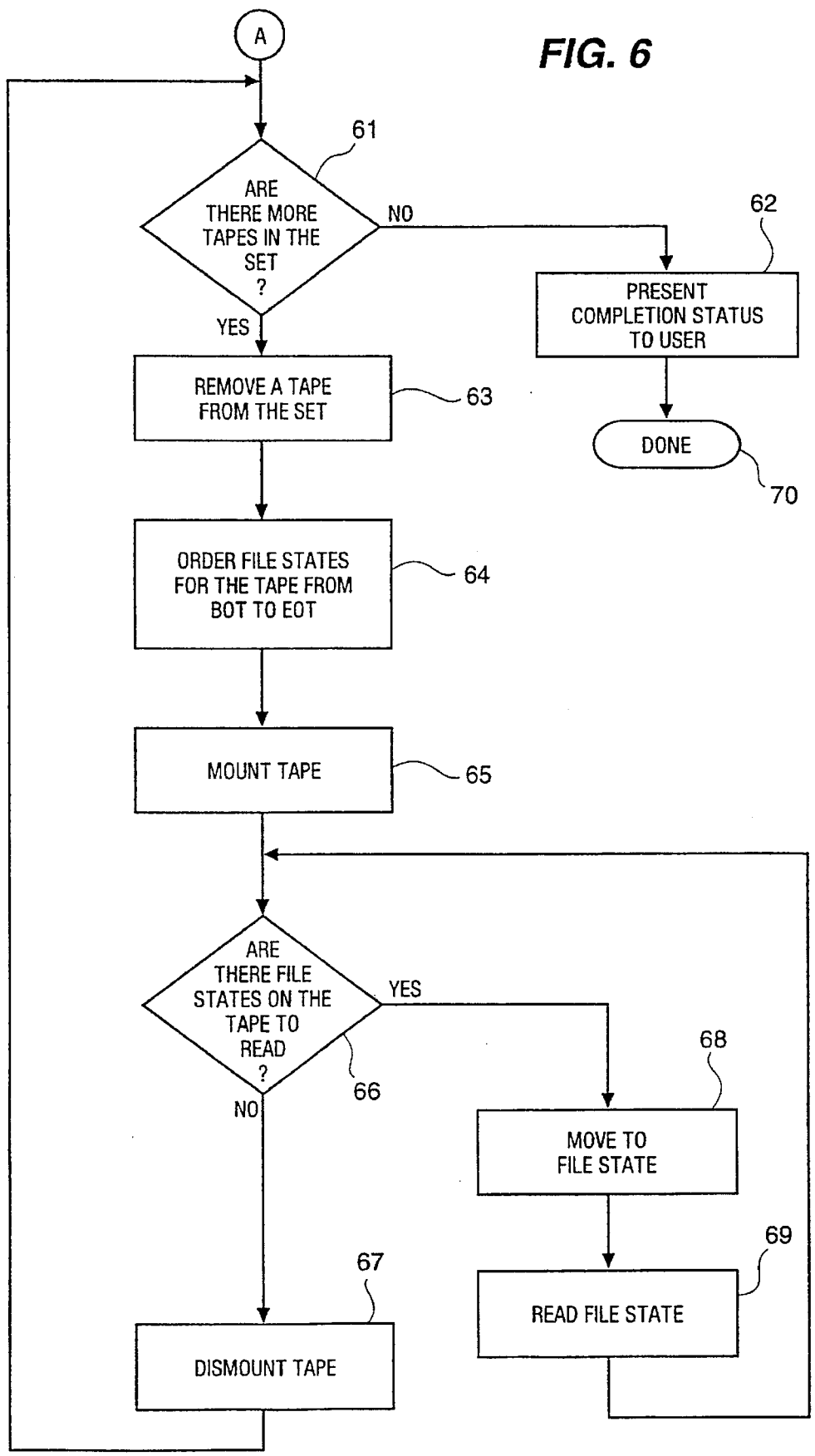

FIGS. 5 and 6 illustrate in flow diagram form the operational steps taken by the data storage and protection system 10 to restore the contents of the memory of computer system 1 after a file system failure has occurred or to restore one or more data files identified by the user to a selected point in time. An example of a file system failure in a personal computer is where a portion of the hard drive that contains the operating system, all application programs and user data files has failed and all the data stored thereon is lost. The user could replace the hard drive with a new hard drive device or restore the lost data files to the remaining working section of the hard drive. This task is time consuming and, with present data backup systems, incomplete at best. The user typically desires to restore the computer system to the state that existed at the instant the computer system memory failed. Existing data backup systems can at best restore the computer system to the date of the last backup operation, and then only with extensive user intervention, since the application programs are typically not backed up and old little used data files must be recovered manually by the user or may even be lost on old overwritten backup tapes.

The data storage and protection system 10 operates in the event described above to automatically recreate, the state of the memory of computer system 1. This is accomplished by the use of the virtual backup memory provided by stash can memory 13 and the backup tape 21.

FIGS. 5 and 6 illustrate in flow diagram form the operational steps taken by the data storage and protection system 10 to restore a data file that has been lost or to recall a version of the data file that previously existed on computer system 1. The process is initiated by the user at step 51 when the user views the data storage and protection system 10 menu screen illustrated in FIG. 2. The user can select one of the many processes that are available on the data storage and protection system 10 by moving the cursor on to a menu selection box indicative of a desired one of these processes. In the present example, to restore a data file, the user moves the cursor on to the box labeled Restore and clicks the select button on the mouse (not shown) attached to computer system 1 (or types in "R" on the keyboard to make the same selection).

The data file restore process enables the user to select a particular data file and a particular vintage of the data file to be restored for access by the user. The user, by selecting the Restore option, is presented with another screen (FIG. 4) by the data storage and protection system 10 to enable the user to identify the desired data file. As can be seen from the display of FIG. 4, the user can navigate through the directory structure presented in the leftmost box of FIG. 4 to locate the directory in which is stored the desired data file. As can be seen from FIG. 4, the desired directory as selected by the user is named "ATESTSUB". The middle box of the display of FIG. 4 presents a listing of all data files that are contained in the selected directory. The example shows only two data files contained in the selected data file directory. The user can then select one of these data files, such as "pereos.doc" as the data file that is to be restored. The final (rightmost) box of the display of FIG. 4 provides the user with a view of the temporal history of the selected data file, whose name appears at the top of this box. Each version of the data file that has been created in computer system 1 is represented in the rightmost box of the display of FIG. 4 as a "file card" that notes the data file activity, such as: "Created", "Modified", "Deleted", "Restored", as well as the other data file information, such as: size, date of action, attributes, and any other relevant information. The file cards are "stacked" in the display of FIG. 4 in chronological order, so the user can immediately note the progression of data file activity for the selected data file.

At step 52, the user selects the data file and the state of the data file that is to be restored by the data storage and protection system 10. The user can select to perform a restore operation at step 53 on additional data files by repeating the operations of steps 51 and 52. Alternatively, the user does not wish to restore additional data files and processing advances to step 54, where the data storage and protection system 10 presents the user with a list of all the selected data file states that the user has selected to restore. The data storage and protection system 10 at step 55 queries the user whether any data file states should be excluded from the displayed list of data files and data file states. If the user elects to exclude data file states, processing advances to step 56 where the user can revise the list provided by the data storage and protection system 10. At step 54, the data storage and protection system 10 displays the revised list of all the selected data file states. Processing then advances to step 55 as described above. Once the user has finished revising this list, processing advances to step 57 where the database 14 of data storage and protection system 10 calculates a set of backup media (magnetic tapes 21) that contain the desired data file states.

The data file restore process then advances to execute the steps of the flow diagram of FIG. 6 to retrieve the selected data file(s) identified by the user. At step 61, the data storage and protection system 10 determines whether there are any backup tapes 21 identified as being included in the set of backup tapes 21. If not, processing advances to step 62 where the user is presented with a completion status and processing exists at step 70. If there are backup tapes 21 included in the set of backup tapes 21, processing advances to step 63 where the data storage and protection system 10 selects a backup tape from the set and at step 64 the database 14 of the data storage and protection system 10 orders the selected data file states that have been identified as being stored on the selected backup tape 21, in order of beginning of tape to end of tape, so these selected data file states can be sequentially read from the selected backup tape 21. At step 65, the data storage and protection system 10 instructs the user to mount the backup tape 21 in the backup drive 20. Once the backup tape 21 is mounted in the backup drive 20, the data storage and protection system 10 determines whether there are selected data file states written on the backup tape 21 that have not yet been read. If there are remaining data file states to be read, the data storage and protection system 10 identifies the next sequential one of these identified data file states that is present on the backup tape 21 at step 68 and at step 69 reads the identified data file state from the backup tape 21. Processing returns to step 66 to determine whether further data file states remain to be retrieved. Once the list of selected data file states for the backup tape 21 is exhausted, processing advances to step 67 where the data storage and protection system 10 instructs the user to dismount the backup tape 21 from the backup drive 20 and processing then returns to step 61 as described above.

Thus, the data storage and protection system 10 presents the user with a three-dimensional view of each data file that has been backed up on to backup tape 21 by the data storage and protection system 10. The user can select not only a particular data file to restore, but can select a point in time by simply selecting all the data files that were resident in the file system memory 9 of computer system 1 at the selected point in time and indicating via the steps described above the version of each such selected data file that is to be restored.

SUMMARY

The data storage and protection system automatically monitors all data file activity on the computer system and maintains a list of all data files that are to be backed up to backup media. The data storage and protection apparatus, on a user initiated, timed or automatic basis, then transmits the selected data files to the backup device for storage on the backup media. If a failure occurs, the data storage and protection system performs the data file location, retrieval and restore operations, independent of the user. This system is therefore simple to use, and provides a much finer granularity of data file restore capability than prior art data backup systems.

While a specific embodiment of the data storage and protection system has been disclosed herein, it is expected that those skilled in the art can devise alternate embodiments and utilize the concepts of this invention in other applications, which embodiments and applications fall within the scope of the claims appended hereto.

We claim:

1. A data storage and protection apparatus for safeguarding integrity of data files stored in a memory of a computer system, comprising:

means for acquiring data indicative of data file activity on said computer system;

means, responsive to said acquired data file activity data, for generating data indicative of data files that have been changed by said data file activity;

means for retrieving only selected data files in their entirety, identified by said generated data and user-input data file backup identification data, that have been changed by said data file activity from said memory; and means for storing said retrieved data files in their entirety, exclusive of other data files stored in said memory, on a backup media to produce a time ordered sequence on said backup media of every version of said selected data files.

2. The apparatus of claim 1 wherein said acquiring means comprises:

means, interposed between application programs resident on said computer system and a file system maintained by said computer system, for intercepting communications between said application programs and said file system; and means for extracting data from said communications indicative of data file activity.

3. The apparatus of claim 2 wherein said acquiring means further comprises:

means for passing said intercepted communications to their original destination.

4. The apparatus of claim 1 wherein said generating means comprises:

means for storing data indicative of data files that have been changed by said data file activity.

5. The apparatus of claim 4 wherein said data file change data generating means further comprises:

means for storing data indicative of type of change made to said data files that have been changed by said data file activity.

6. The apparatus of claim 4 wherein said generating means further comprises:

means for storing data indicative of temporal nature of a change made to said data files that have been changed by said data file activity.

7. The apparatus of claim 4 wherein said generating means further comprises:

means for creating a directory of data files that are to be written to said backup media.

8. The apparatus of claim 7 wherein said storing means comprises:

means for writing each said data files listed in said directory on said backup media; and means for writing said directory on said backup media upon completion of writing said data files listed in said directory on said backup media.

9. The apparatus of claim 4 wherein said generating means further comprises:

means for storing in memory a data file in its entirety in response to a user changing said data file.

10. The apparatus of claim 9 wherein said retrieving means comprises:

means, responsive to said storing means storing a changed data file, for retrieving said stored data file from said memory; and means for transmitting said retrieved data file to said storing means for writing on said backup media.

11. The apparatus of claim 10 wherein a user requests access to said changed data file, said apparatus further comprises:

means for retrieving said changed data file from said backup media.

12. The apparatus of claim 1 further comprising:

means, responsive to a user requesting a specific temporal version of a data file, for recalling said requested data file from said backup media.

13. The apparatus of claim 12 wherein said recalling means comprises:

means for reading said directory stored on said backup media to identify a location on said backup media wherein said requested data file is stored; and means for automatically reading said requested data file from said identified location.

14. The apparatus of claim 1 further comprising:

means, responsive to a user requesting a specific temporal version of said computer system memory, for recalling all data files extant on said computer system memory at a point in time identified by said user from said backup media.

15. The apparatus of claim 14 wherein said recalling means comprises:

means for reading said directory stored on said backup media to identify a location on said backup media wherein each of said extant data files is stored; and means for automatically reading all said extant data files from said identified locations.

16. A method for safeguarding integrity of data files stored in a memory of a computer system, comprising the steps of:

acquiring data indicative of data file activity on said computer system;

generating, in response to said acquired data, data indicative of data files that have been changed by said data file activity;

retrieving only selected data files in their entirety, identified by said generated data and user-input data file backup identification data, that have been changed by said data file activity from said memory and storing said retrieved data files in their entirety, exclusive of other data files stored in said memory, on a backup media to produce a time ordered sequence on said backup media of every version of said selected data files.

17. The method of claim 16 wherein said step of acquiring comprises:

intercepting communications between application programs resident on said computer system and a file system maintained by said computer system; and extracting data from said intercepted communications indicative of data file activity.

18. The method of claim 17 wherein said step of acquiring further comprises:

passing said intercepted communications to their original destination.

19. The method of claim 16 wherein said step of generating comprises:

storing data indicative of data files that have been changed by said data file activity.

20. The method of claim 19 wherein said step of generating comprises:

storing data indicative of type of change made to said data files that have been changed by said data file activity.

21. The method of claim 19 wherein said step of generating further comprises:

storing data indicative of temporal nature of a change made to said data files that have been changed by said data file activity.

22. The method of claim 19 wherein said step of generating further comprises:

creating a directory of data files that are to be written to said backup media.

23. The method of claim 22 wherein said step of storing comprises:

writing each said data files listed in said directory on said backup media; and writing said directory on said backup media upon completion of writing said data files listed in said directory on said backup media.

24. The method of claim 19 wherein said step of generating further comprises:

storing in a memory a data file in its entirety in response to a user changing said data file.

25. The method of claim 24 wherein said step of retrieving comprises:

retrieving, in response to said storing means storing a changed data file, said stored data file from said memory; and transmitting said retrieved data file for writing on said backup media.

26. The method of claim 25 wherein a user requests access to said changed data file, said method further comprises the step of:

retrieving said changed data file from said backup media.

27. The method of claim 16 further comprising the step of:

recalling, in response to a user requesting a specific temporal version of a data file, said requested data file from said backup media.

28. The method of claim 27 wherein said step of recalling comprises:

reading said directory stored on said backup media to identify a location on said backup media wherein said requested data file is stored; and automatically reading said requested data file from said identified location.

29. The method of claim 16 further comprising the step of:

recalling, in response to a user requesting a specific temporal version of said computer system memory, all data files extant on said computer system memory at a point in time identified by said user from said backup media.

30. The method of claim 29 wherein said step of recalling comprises:

reading said directory stored on said backup media to identify a location on said backup media wherein each of said extant data files is stored; and automatically reading all said extant data files from said identified locations.

31. A tracking and preservation system installed on-board a computer for tracking and preserving the file system of a computer, the file tracking and preservation system comprising:

a data file monitor which monitors communications affecting the data file system of the computer transmitted between an applications program executed by the computer and an operating system of the computer;

an event log file maintained in a memory of the computer and in which the monitor creates an entry for a change in the file system of the computer;

a database which reads the event log to determine what data files have been changed since execution of a last back-up operation;

an extended file system wherein is stored temporally oriented versions of data files requiring back-up and a history log thereof;

a driver which interfaces with a back-up media-handling device;

a spine system which transmits one or more versions of selected data files in the extended file system to the driver when a back-up operation is requested.

32. The system of claim 31, further comprising a stash can memory for temporarily storing data files deleted from the extended file system.

33. The system of claim 32, wherein the back-up operation is requested upon contents of the stash can memory reaching a predetermined level.

34. The system of claim 31, wherein an oldest section of the history log of the extended file system is also transmitted by the spine system to the driver.

35. The system of claim 31, further comprising a graphical interface which allows a user to view contents of at least a portion of the history log of the extended data file.

36. The system of claim 31, wherein the graphical interface generates a display of the contents of at least a portion of the history log of the extended data file, the display including a depiction of note cards corresponding to versions of a selected data file.

37. The system of claim 36, wherein the note cards are depicted in the display generated by the graphical interface as being in a predetermined order.

38. The system of claim 36, wherein the note cards are depicted in the display generated by the graphical interface as including a graphical marker indicative of one of the following states: created, modified, deleted, restored.

39. The system of claim 31, wherein the database has sufficient information from which a set of back-up media can be determined relative to a selected data file which is to be restored.

* * * * *